US012436482B2

(12) United States Patent
Zeng et al.

(10) Patent No.: US 12,436,482 B2
(45) Date of Patent: Oct. 7, 2025

(54) TONER CARTRIDGE AND LASER PRINTER

(71) Applicant: Huawei Technologies Co., Ltd., Shenzhen (CN)

(72) Inventors: Guobao Zeng, Dongguan (CN); Haiyu Cheng, Shenzhen (CN); Shouchu Yuan, Shenzhen (CN); Wei Jiang, Shenzhen (CN); Hailiang Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/691,298

(22) PCT Filed: Sep. 9, 2022

(86) PCT No.: PCT/CN2022/118253

§ 371 (c)(1),
(2) Date: Mar. 12, 2024

(87) PCT Pub. No.: WO2023/036319

PCT Pub. Date: Mar. 16, 2023

(65) Prior Publication Data

US 2024/0393715 A1 Nov. 28, 2024

(30) Foreign Application Priority Data

Sep. 13, 2021 (CN) ......................... 202111070829.5

(51) Int. Cl.
*G03G 15/08* (2006.01)
*G03G 15/00* (2006.01)
(Continued)

(52) U.S. Cl.
CPC ....... *G03G 15/0875* (2013.01); *G03G 15/757* (2013.01); *G03G 21/1647* (2013.01); *G03G 21/1821* (2013.01); *G03G 2215/068* (2013.01)

(58) Field of Classification Search
CPC .... G03G 15/00; G03G 15/08; G03G 15/0875; G03G 15/0886; G03G 15/0889;
(Continued)

(56) References Cited

U.S. PATENT DOCUMENTS 5,999,770 A 12/1999 Li
9,989,917 B1 * 6/2018 Hale .................. G03G 21/1821
(Continued)

FOREIGN PATENT DOCUMENTS

CN 201087852 Y 7/2008
CN 110989308 A 4/2020
JP H08146738 A 6/1996

*Primary Examiner* — Sophia S Chen
(74) *Attorney, Agent, or Firm* — Slater Matsil, LLP

(57) ABSTRACT

A toner cartridge is disclosed. A hole and a window are disposed on two sides of a cartridge body separately. A toner hopper is disposed in the cartridge body, and is configured to accommodate toner, and a supply opening exposed in the window is disposed at a position that is on the toner hopper and that faces the window. The first agitator is disposed in the toner hopper, and is configured to transport the toner in the toner hopper to the supply opening. A first hopper door is slidably disposed on a side that is of the toner hopper and that faces the window, a slot is disposed on the first hopper door, and the first hopper door may open or close the supply opening when sliding. The first clamping hook is disposed on the second side of the cartridge body.

17 Claims, 9 Drawing Sheets

(51) Int. Cl.
*G03G 21/16* (2006.01)
*G03G 21/18* (2006.01)

(58) Field of Classification Search
CPC .. G03G 15/757; G03G 21/16; G03G 21/1647; G03G 21/1817; G03G 21/1821; G03G 2215/068; G03G 2221/1846; G03G 2221/1853
See application file for complete search history.

(56) References Cited

U.S. PATENT DOCUMENTS

2014/0205315 A1* 7/2014 Jang .................. G03G 21/1821 399/119
2021/0200142 A1* 7/2021 Cavill ................ G03G 21/1821

* cited by examiner

TONER CARTRIDGE AND LASER PRINTER

CROSS-REFERENCE TO RELATED APPLICATIONS

This application is a national stage of International Application No. PCT/CN2022/118253, filed on Sep. 9, 2022, which claims priority to Chinese Patent Application No. 202111070829.5, filed on Sep. 13, 2021. Both of the aforementioned applications are hereby incorporated by reference in their entireties.

TECHNICAL FIELD

This application relates to the field of printer technologies, and in particular, to a toner cartridge and a laser printer.

BACKGROUND

A laser printer is a printing output device that combines a laser scanning technology with an electronic photographing technology, and has advantages such as a fast printing speed and high imaging quality. A drum cartridge and a toner cartridge that are used in the laser printer are generally designed in an integrated manner or in a separate manner. For the toner cartridge and the toner cartridge that are designed in the integrated manner, a user needs to replace the drum cartridge together with the toner cartridge when replacing the toner cartridge. Consequently, replacement costs are high. In addition, the user touches an internal structure of the printer during replacement, resulting in poor operation experience. For the drum cartridge and the toner cartridge that are designed in the separate manner, the drum cartridge and the toner cartridge may be relatively independent. However, when the toner cartridge is replaced, an entire assembly structure of the drum cartridge and the toner cartridge usually needs to be taken out from the printer, and then the toner cartridge whose toner is used up is removed from the drum cartridge. Then, a new toner cartridge is installed, and next, the entire assembly structure of the drum cartridge and the toner cartridge is installed into the printer. A replacement process is cumbersome, and has poor operability.

SUMMARY

This application provides a toner cartridge and a laser printer, to improve reliability of using the toner cartridge and reduce costs of replacing the toner cartridge in the laser printer.

According to a first aspect, this application provides a toner cartridge. The toner cartridge may include a cartridge body, a toner hopper, a first agitator, a first hopper door, a first clamping hook, and a handle. The cartridge body may include a first side and a second side that are at opposite positions, a hole is disposed on the first side of the cartridge body, and a window is disposed on the second side of the cartridge body. The toner hopper may be disposed in the cartridge body, and is configured to accommodate toner. A supply opening that can be exposed to the window is disposed at a position that is on the toner hopper and that faces the window. The first agitator may be disposed in the toner hopper, and is configured to transport the toner in the toner hopper to the position of the supply opening. The first hopper door may be slidably assembled on a side that is of the toner hopper and that faces the window, a slot may be disposed on the first hopper door, and the first hopper door may open or close the supply opening when sliding. The first clamping hook may be disposed on the second side of the cartridge body, and is configured to be clamped to the slot when the first hopper door closes the supply opening. The handle may be slidably disposed on a side that is of the toner hopper and that is away from the window, the handle may pass through an opening and be exposed to an outer side of the cartridge body, and the handle may be fastened to the first hopper door.

In the foregoing solutions, the supply opening of the toner cartridge may be locked by using the first hopper door, so that toner leakage in the toner cartridge can be avoided, and reliability of using the toner cartridge can be improved. In addition, because components such as a photosensitive drum and a developer roller are not disposed in the toner cartridge, costs of replacing the toner cartridge for the laser printer is low.

In some possible implementation solutions, the first clamping hook may be disposed on a side that is of the first hopper door and that faces the toner hopper. In this way, when an external force is applied, the first clamping hook may be retracted to an inner side of the cartridge body to unlock the first hopper door, to open the supply opening.

In some possible implementation solutions, the first agitator includes a rotating shaft and a plurality of blades fastened to the rotating shaft. The plurality of blades may be disposed spirally an axial direction of the rotating shaft. When the rotating shaft rotates, the blades can drive the toner in the toner hopper to generate a spiral motion, and transport the toner to the supply opening.

For example, the blade may be of an arch structure, and an arc segment of the blade is disposed close to an inner wall of the toner hopper, so that the blade can better match a shape of the inner wall of the toner hopper. This implements full stirring of the toner.

In some possible implementation solutions, an included angle between two adjacent blades may range from 75° to 90°.

In some possible implementation solutions, a first agitator mylar may be disposed on the blade, the first agitator mylar is made of a flexible material, and an end part of the first agitator mylar exceeds a side that is of the blade and that is away from the rotating shaft, and is in contact with the inner wall of the toner hopper. When the rotating shaft rotates, the end part of the first agitator mylar may be in contact with and rub against the inner wall of the toner hopper, to ensure that the toner can be fully stirred. In addition, because the first agitator mylar is made of a flexible material, friction between the first agitator mylar and the inner wall of the chalk can be further reduced. This reduces torque of the first agitator and reduces load of the toner cartridge for transporting the toner to the drum cartridge assembly.

In some possible implementation solutions, a second agitator mylar may be further disposed at a position that is on the rotating shaft and that corresponds to the supply opening, and an end part of the second agitator mylar may be in contact with the inner wall of the toner hopper. When the rotating shaft rotates, the second agitator mylar may transport the toner at the supply opening in the toner hopper to the outside of the toner hopper. This improves transport efficiency of the toner.

For example, the second agitator mylar may also be made of a flexible material. In this way, the end part of the second agitator mylar may also be in contact with and rub against the inner wall of the toner hopper, so that the toner at the supply opening can be fully stirred.

During specific disposition, there may be two second agitator mylars, and the two second agitator mylars may be centrosymmetrically disposed relative to the rotating shaft. This improves transport efficiency of the toner.

In some possible implementation solutions, the handle may include a first sliding rail, a handle body, and a connection arm. The first sliding rail may be disposed on the side that is of the toner hopper and that is away from the window, the handle body is slidably assembled on the first sliding rail, and the connection arm may pass through a gap between the toner hopper and an inner wall of the cartridge body and be fastened to the first hopper door, so that when a user slides the handle body, the first hopper door can be driven to slide synchronously, to open or close the supply opening.

In some possible implementation solutions, a second sliding rail may be disposed on the side that is of the toner hopper and that faces the window, and the first hopper door may be slidably assembled on the second sliding rail. A distance between a connection position of the connection arm and the first hopper door and the second sliding rail may not be not greater than 2 mm in a direction from the first side to the second side of the cartridge body. The distance between the connection position of the connection arm and the first hopper door and the second sliding rail is a distance between a force point of the first hopper door and the second sliding rail. A smaller distance indicates a smaller deflection torque applied to the first hopper door, and the first hopper door can slide more smoothly on the second sliding rail.

In some possible implementation solutions, a first opening may be disposed on the first hopper door. When the first hopper door slides to a position at which the first opening and the supply opening are opposite to each other, the first hopper door may open the supply opening. When the first hopper door slides to a position at which the first opening and the supply opening are staggered, the first hopper door may close the supply opening.

According to a second aspect, this application further provides a laser printer. The laser printer may include a housing, a drum cartridge assembly, and the toner cartridge according to any one of the foregoing possible implementation solutions. An installation hole is disposed on a side surface of the housing, the drum cartridge assembly is disposed in the housing, the drum cartridge assembly may include a hopper body, an accommodating groove is disposed at a position that is on a side of the hopper body and that corresponds to the installation hole, and a toner inlet connected to the inside of the hopper body is disposed at the bottom of the accommodating groove. The toner cartridge may be assembled into the accommodating groove through the installation hole, and the supply opening of the toner cartridge and the toner inlet are opposite to each other, so that the toner can be transported to the drum cartridge assembly when the supply opening is opened.

In the foregoing solutions, the toner cartridge and the drum cartridge assembly are disposed independently of each other, so that the toner cartridge in the laser printer can be separately replaced. A replacement step is simple. The toner cartridge and the drum cartridge assembly are arranged in a transverse direction of the laser printer. Compared with a manner in which the toner cartridge and the drum cartridge assembly are vertically stacked in the conventional technology, this helps reduce a height size of the laser printer. When the toner cartridge is replaced, only the toner cartridge needs to be taken out and installed in an installation hole on a side surface of the laser printer, and an upper cover of the laser printer does not need to be opened. During an operation, a user does not see an internal part of the printer other than the drum cartridge assembly. This helps improve user experience.

In some possible implementation solutions, the drum cartridge assembly may further include a second hopper door, the second hopper door is slidably disposed at the bottom of the accommodating groove, and the second hopper door may open or close the toner inlet when sliding. A convex rib is disposed on a side that is of the second hopper door and that faces the toner cartridge, and the convex rib may be inserted into the slot of the first hopper door when the toner cartridge is installed in the accommodating groove. In this case, the first clamping hook is deformed and retracted to the inside of the cartridge body after being squeezed by the convex rib, to unlock the first hopper door. When the first hopper door slides under the driving of the handle, the second hopper door also slides synchronously with the first hopper door based on clamping and matching between the convex rib and the slot. Therefore, when the first hopper door opens the supply opening, the second hopper door can also open the toner inlet, so that a channel between the toner cartridge and the drum cartridge assembly is connected.

In some possible implementation solutions, a second opening may be disposed on the second hopper door. When the second hopper door slides to a position at which the second opening and the toner inlet are opposite to each other, the second hopper door may open the toner inlet. When the second hopper door slides to a position at which the second opening and the toner inlet are staggered, the second hopper door may close the toner inlet.

In some possible implementation solutions, a second clamping hook is disposed at the bottom of the accommodating groove. The second clamping hook includes an elastic arm, a clamping hook body, and a protrusion part, the clamping hook body and the protrusion part are disposed on a side that is of the elastic arm and that faces the toner cartridge, and the clamping hook body is configured to be clamped to the second opening when the second hopper door closes the toner inlet. An outer wall of the second side of the cartridge body may squeeze the protrusion part when the toner cartridge is installed in the accommodating groove, so that the elastic arm bends toward a side away from the toner cartridge, and the second hopper door by the second clamping hook can be unlocked. In this case, the second hopper door can slide synchronously with the first hopper door.

In some possible implementation solutions, a limiting arm may be disposed at the bottom of the accommodating groove, and there is a gap between the limiting arm and the bottom of the accommodating groove. When the first hopper door slides toward a direction of opening the supply opening, the first hopper door may be inserted into the gap between the limiting arm and the bottom of the accommodating groove, so that the limiting arm is used to limit the toner cartridge in an insertion direction of the toner cartridge and the accommodating groove. This prevents the toner cartridge from loosening or falling off in a working process of the laser printer.

In some possible implementation solutions, a guide sliding slot and a torsion spring may be disposed on a side wall of the accommodating groove. The guide sliding slot may extend in a depth direction of the accommodating groove. One end of the torsion spring may be fastened to the hopper body, the other end of the torsion spring has a bending part, and limiting space may be formed between the bending part and the bottom of the guide sliding slot. A limiting shaft cooperating with the guide sliding slot is disposed at an end part of the cartridge body, and when the toner cartridge is installed in the accommodating groove, the limiting shaft is limited in the limiting space by the bending part. By using this design, the user can easily identify whether the toner cartridge is properly installed, and the bending part may also apply a specific abutment force to the limiting shaft, so that the toner cartridge can be more stably fastened in the accommodating groove.

In some possible implementation solutions, a first gear may be disposed at an end of the rotating shaft of the first agitator. The drum cartridge assembly may further include a drive motor and a gear group, and the drive motor may be in transmission connection to the first gear by using the gear group, to transfer a driving force to the first gear by using the gear group.

For example, the first gear may be disposed between the end part of the toner hopper and the inside of the cartridge body. The drum cartridge assembly may further include a gear shaft, one end of the gear shaft is located inside the hopper body, and the other end of the gear shaft may be extended into the accommodating groove through an end part of the accommodating groove. A second gear is disposed at an end that is of the gear shaft and that is located in the accommodating groove. After the toner cartridge is installed in position, the second gear may be automatically engaged with the second gear. A third gear is disposed at an end that is of the gear shaft and that is located in the hopper body. The third gear is in transmission connection to the gear group, so that the driving force output by the drive motor can be sequentially transferred to the first agitator by using the gear group and the gear shaft.

REFERENCE NUMERALS

Figure 1:
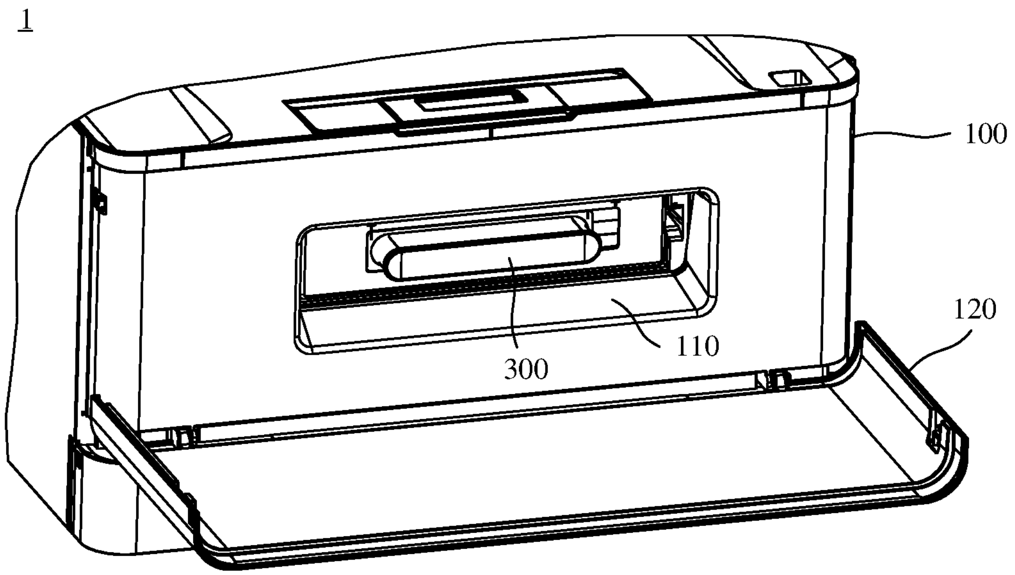
FIG. 1 is a schematic diagram of a partial structure of a laser printer according to an embodiment of this application.

1: laser printer; 100: housing; 200: drum cartridge assembly; 300: toner cartridge; 211: accommodating groove; 110: installation hole;
120: cover plate; 310: cartridge body; 320: handle; 330: toner hopper; 340: first agitator; 350: first hopper door;
311: front housing; 312: cover body; 331: supply opening; 332: first end of the toner hopper; 333: second end of the toner hopper; 3121: window;
341: rotating shaft; 342: blade; 3411: first fastening plate; 3412: second fastening plate; 343: first agitator mylar;
344: second agitator mylar; 360: first gear; 321: first sliding rail; 322: handle body; 323: connection arm; 313: hole;
334: second sliding rail; 3231: groove; 352: extension part; 314: first clamping hook; 353: slot; 210: hopper body;
220: second hopper door; 212: toner inlet; 2111: first end of the accommodating groove; 213: second gear; 214: third sliding rail;
221: second opening; 215: second clamping hook; 2151: elastic arm; 2152: clamping hook body; 2153: protrusion part;
216: second foam; 222: third foam; 223: convex rib; 217: limiting arm; 315: limiting shaft; 2112: guide sliding slot;
218: torsion spring; 2181: bending part; 2113: limiting space; 230: second agitator; 240: supply roller; 250: developer roller; and
260: doctor blade; 270: photosensitive drum; and 280: charge roller.

DETAILED DESCRIPTION OF ILLUSTRATIVE EMBODIMENTS

To make the objectives, technical solutions, and advantages of this application clearer, the following further describes this application in detail with reference to the accompanying drawings.

A laser printer is a printing output device that combines a laser scanning technology with an electronic photographing technology, and has advantages such as a fast printing speed and high imaging quality. A basic working principle of the laser printer is as follows: The laser printer receives binary data information from a computer, converts the binary data information into a video signal through a video controller, then a video interface or a control system converts the video signal into a laser drive signal, next, a laser scanning system generates a laser beam that carries character information, and finally, an electronic photographing system images the laser beam and transfers an image onto paper.

In the laser printer, 70% of imaging components are concentrated in a drum cartridge, and printing quality is largely determined by the drum cartridge. The toner cartridge generally includes several parts: a photosensitive drum, a developer roller, and a toner cartridge. The toner cartridge is a structure configured to provide toner for the laser printer, and is a consumable product in the laser printer. When the toner in the toner cartridge is used up, the toner cartridge needs to be replaced in time, to ensure printing effect of the laser printer.

Currently, the drum cartridge and the toner cartridge that are used in the laser printer generally designed in a drum-toner integrated manner or a drum-toner separated manner. In the printer designed in the drum-toner integrated manner, the drum cartridge and the toner cartridge are integrated on a same apparatus. A user needs to replace the drum cartridge together with the toner cartridge when replacing the toner cartridge. Consequently, replacement costs are high. In addition, the user touches an internal structure of the printer during replacement, resulting in poor operation experience. However, for the printer designed in the drum-toner separated manner, when replacing the toner cartridge, the user usually also needs to take out the entire drum cartridge from the printer, then remove the toner cartridge whose toner is used up from the drum cartridge, install a new toner cartridge, and then install the entire drum cartridge into the printer. A replacement process is cumbersome, and has poor operability.

In view of this, embodiments of this application provide a toner cartridge and a laser printer including the toner cartridge, to separately replace the toner cartridge without taking out a drum cartridge, simplify a replacement process, and reduce replacement costs.

Figure 2:
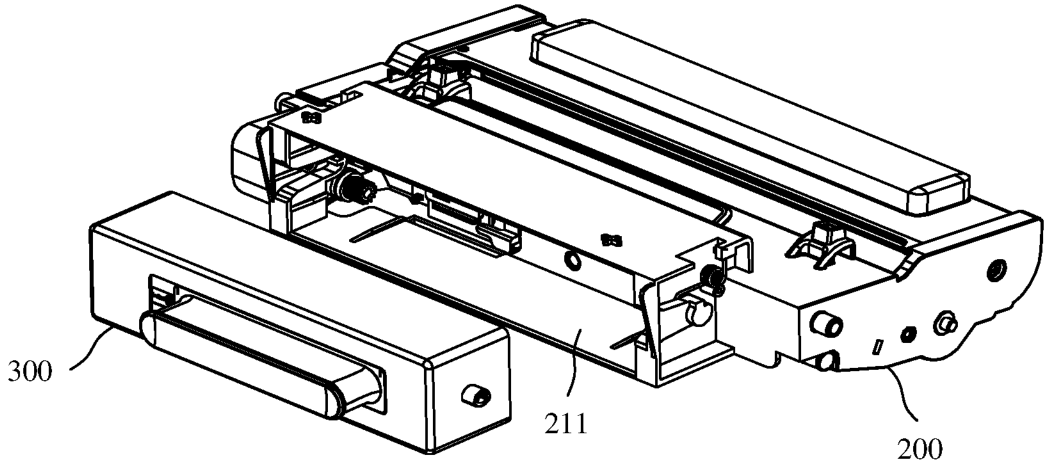
FIG. 2 is a schematic diagram of a partial inner structure of the laser printer shown in FIG. 1.

FIG. 1 is a schematic diagram of a partial structure of a laser printer according to an embodiment of this application. FIG. 2 is a schematic diagram of a partial inner structure of the laser printer shown in FIG. 1. Refer to both FIG. 1 and FIG. 2. A laser printer 1 provided in this embodiment of this application may include a housing 100, a drum cartridge assembly 200, and a toner cartridge 300. The drum cartridge assembly 200 and the toner cartridge 300 are disposed in the housing 100, and are detachably connected to each other. During specific implementation, an accommodating groove 211 may be disposed on the drum cartridge assembly 200, and an installation hole 110 is provided at a position that is on a side surface of the housing 100 and that corresponds to the accommodating groove 211. A user may assemble the toner cartridge 300 into the accommodating groove 211 through the installation hole 110, so that the toner cartridge 300 transports toner to the inside of the drum cartridge assembly 200. Because the installation hole 110 is connected to only the accommodating groove 211 of the drum cartridge assembly 200, the user does not see an internal part of the laser printer 1 other than the drum cartridge assembly 200 in a process of installing the toner cartridge 300, and overall operation experience is good. A cover plate 120 may be disposed on the side surface of the housing 100, and the cover plate 120 may be hinged to the housing 100 by using a structure, for example, a hinge. When replacing the toner cartridge 300, the user may open the cover plate 120 to expose the installation hole 110. After replacement is completed, the user closes the cover plate 120 to shield the installation hole 110 and the toner cartridge 300. This helps improve appearance quality of the laser printer 1. In addition, although not shown in the figure, the laser printer 1 may further include apparatuses such as a laser, an acoustic-optic modulator, a high-frequency drive, a scanner, a synchronizer, and a light deflector. These apparatuses are well-known and conventional functional components in the laser printer 1, and specific structure setting forms of the apparatuses are not described herein.

Figure 3:
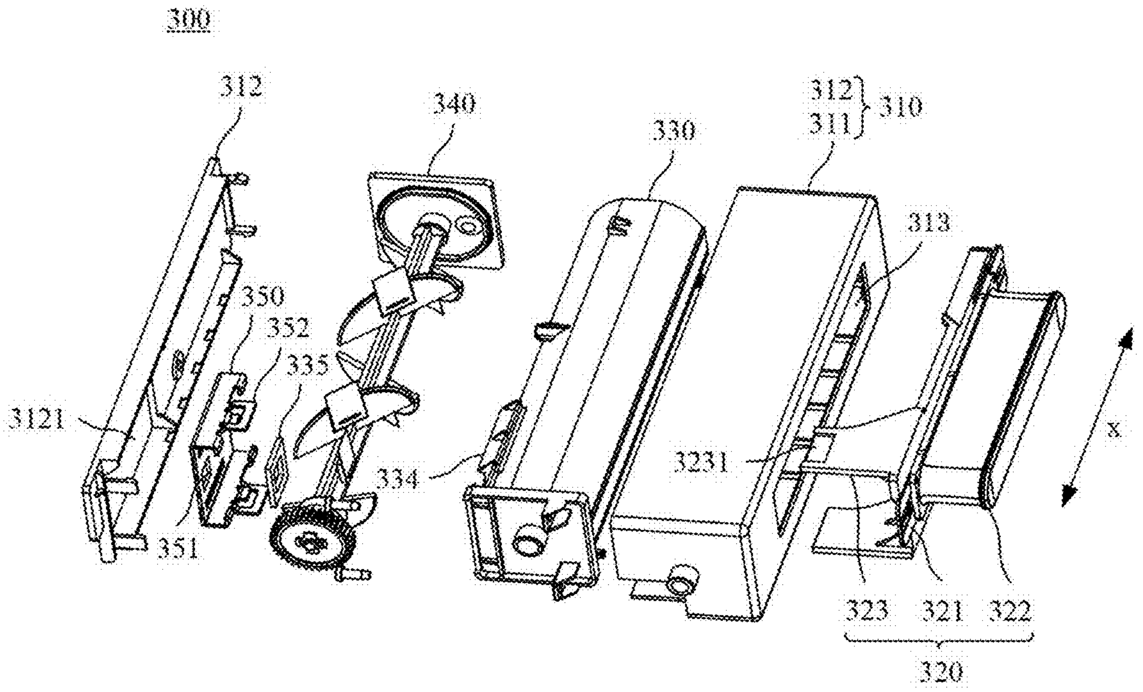
FIG. 3 is a schematic diagram of an exploded structure of a toner cartridge according to an embodiment of this application.

FIG. 3 is a schematic diagram of an exploded structure of the toner cartridge according to an embodiment of this application. Refer to FIG. 3. The toner cartridge 300 provided in this embodiment of this application may include a cartridge body 310, a handle 320, a toner hopper 330, a first agitator 340, and a first hopper door 350. The cartridge body 310 may include a cover body 312 and a front housing 311 having an accommodating cavity, and the cover body 312 is detachably connected to the front housing 311, to seal the accommodating cavity. The toner hopper 330 is disposed in the accommodating cavity of the cartridge body 310, and may be used to accommodate toner. The first agitator 340 is disposed in the toner hopper 330, and the first agitator 340 may be configured to stir the toner and transport the toner to a specific position in the toner hopper 330.

Figure 4:
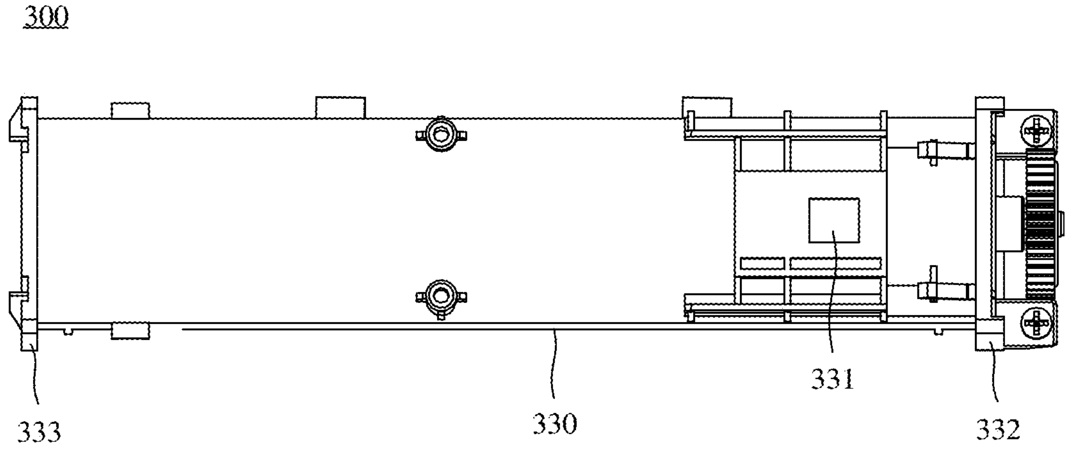
FIG. 4 is a schematic diagram of a partial plane structure of a toner cartridge according to an embodiment of this application.

FIG. 4 is a schematic diagram of a partial plane structure of the toner cartridge according to an embodiment of this application. Refer to both FIG. 3 and FIG. 4. A supply opening 331 may be disposed on a side that is of the toner hopper 330 and that faces the cover body 312, and the supply opening 331 may connect the inside and the outside of the toner hopper 330. During specific disposition, the supply opening 331 may be disposed near an end of the toner hopper 330 in a length direction of the toner hopper 330, for example, disposed near a first end 332 of the toner hopper 330. A cross-sectional shape of the supply opening 331 is not limited, for example, may be a rectangular shape shown in FIG. 4. Certainly, in another implementation, the cross-sectional shape of the supply opening 331 may be a circle, an ellipse, or another regular or irregular shape. Details are not described herein. Correspondingly, a window 3121 may be disposed at a position that is on the cover body 312 and that corresponds to the supply opening 331, and a cross-sectional shape of the window 3121 may also be a rectangle, a circle, or the like. This is not limited in this application either. A cross-sectional area of the window 3121 may be greater than a cross-sectional area of the supply opening 331, to completely expose the supply opening 331. In this case, the toner in the toner hopper 330 may be transported to the drum cartridge assembly through the supply opening 331 and the window 3121. It may be understood that a speed at which the toner cartridge 300 transports the toner to the drum cartridge assembly is related to the area of the supply opening 331. In this embodiment, the area of the supply opening 331 may not be less than 55 $mm^2$, to ensure a toner supply when the laser printer works.

Figure 5:
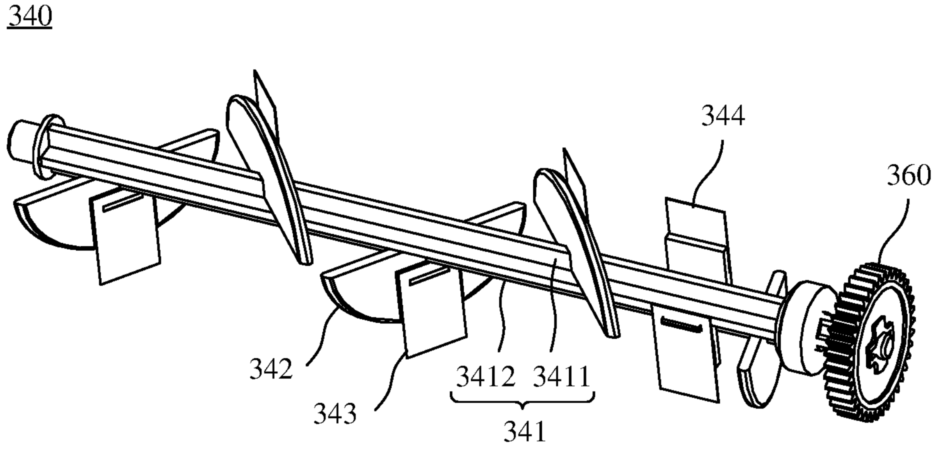
FIG. 5 is a schematic diagram of a structure of a first agitator according to an embodiment of this application.

FIG. 5 is a schematic diagram of a structure of the first agitator according to an embodiment of this application. Refer both to FIG. 4 and FIG. 5. The first agitator 340 may include a rotating shaft 341 and a blade 342 disposed on the rotating shaft 341. In some embodiments, a plurality of blades 342 may be disposed on the rotating shaft 341 at intervals, and the plurality of blades 342 may be approximately arranged spirally in an axial direction of the rotating shaft 341, so that when the rotating shaft 341 rotates, the blades 342 can drive the toner in the toner hopper 330 to generate a spiral motion, so as to transport the toner in the toner hopper 330 from one end of the toner hopper 330 to the other end of the toner hopper 330. It may be understood that a transport direction of the toner in the toner hopper 330 may be determined by a rotation direction of the rotating shaft 341. The first agitator 340 shown in FIG. 4 is used as an example. When the rotating shaft 341 rotates clockwise, the blades 342 are arranged in a spiral rising trend in a direction from a second end 333 of the toner hopper 330 to the first end 332 of the toner hopper 330, so that the toner can be transported from the second end 333 of the toner hopper 330 to the first end 332 of the toner hopper 330. In this way, the toner is carried to the supply opening 331 of the first end 332.

A material of the blade 342 is not limited, and may be, for example, plastic. In addition, the blade 342 may be of an arch structure. In this case, a straight line segment of the blade 342 may be fastened to the rotating shaft 341, and an arc segment of the blade 342 is disposed close to an inner wall of the toner hopper 330, so that the blade 342 can better match a shape of the inner wall of the toner hopper 330. This implements full stirring of the toner. For example, the blade 342 may be specifically of a semicircular structure.

Figure 6:
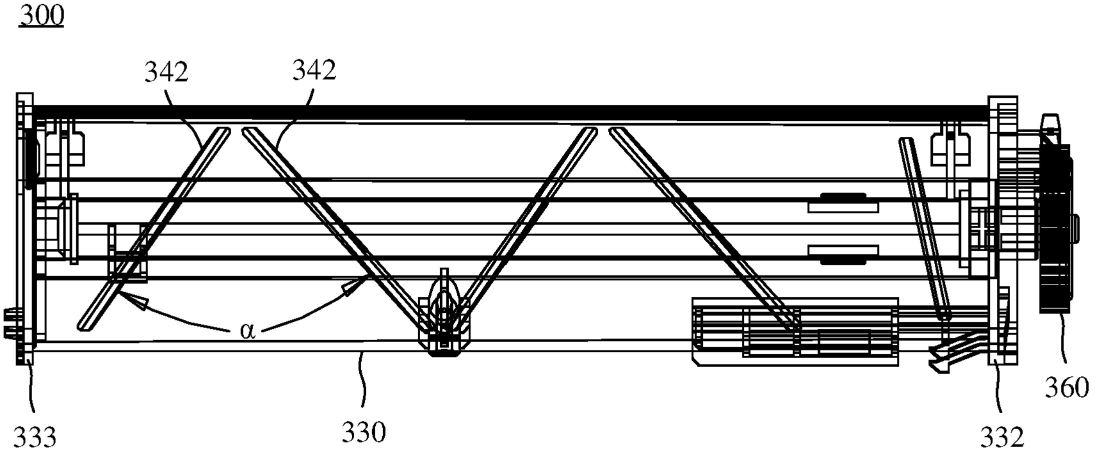
FIG. 6 is a side view of a partial structure of a toner cartridge according to an embodiment of this application.

FIG. 6 is a side view of a partial structure of the toner cartridge according to an embodiment of this application. Refer to both FIG. 5 and FIG. 6. In some embodiments, the rotating shaft 341 may include a first fastening plate 3411 and a second fastening plate 3412. The first fastening plate 3411 and the second fastening plate 3412 separately extend in the axial direction of the rotating shaft 341, and may be vertically crossed. In this case, a cross-sectional shape of the rotating shaft 341 is approximately a cross-shaped structure. All of the plurality of blades 342 may be disposed on the first fastening plate 3411. During specific implementation, a notch may be disposed on the straight line segment of the blade 342, and the blade 342 may be clamped and fastened to the first fastening plate 3411 through the notch. In addition, in two adjacent blades 342, one blade 342 may be disposed on one side of the second fastening plate 3412, and the other blade 342 is disposed on the other side of the second fastening plate 3412, so that the plurality of blades 342 may be arranged in sequence to form a structure similar to a spiral shape. In this embodiment, an included angle a between two adjacent blades 342 may range from 75° to 90°. For example, the included angle a between the two adjacent blades 342 may be specifically 75°, 80°, 83°, 90°, or the like.

In addition, in this embodiment of this application, a first agitator mylar 343 may be further disposed on the blade 342. The first agitator mylar 343 may be approximately of a rectangular structure. An end part of the first agitator mylar 343 may extend to a side that is of the blade 342 and that is away from the rotating shaft 341, that is, the end part of the first agitator mylar 343 may be disposed beyond the arc segment of the blade 342. The first agitator mylar 343 may be made of a flexible material, for example, may be polyethylene glycol terephthalate (polyethylene glycol terephthalate, PET). When the first agitator mylar 343 is connected to the blade 342, the first agitator mylar 343 may be specifically fastened to the blade 342 through pasting and hot melting. The material of the first agitator mylar 343 is softer than that of the plastic blade 342. When the rotating shaft 341 rotates, the end part of the first agitator mylar 343 may be in contact with and rub against the inner wall of the toner hopper 330, to ensure that the toner can be fully stirred, and avoid a case in which transport efficiency of the toner is low because the end part of the blade 342 is pressed against or not in contact with the inner wall of the toner hopper 330. In addition, a torque of the first agitator 340 may be reduced. This reduces a load of the toner cartridge transporting the toner to the drum cartridge assembly.

Refer to both FIG. 5 and FIG. 6. A second agitator mylar 344 may be further disposed on the rotating shaft 341, and the second agitator mylar 344 may also be approximately of a rectangular structure. During specific implementation, the second agitator mylar 344 may be disposed at a position that is on the rotating shaft 341 and that corresponds to the supply opening, so that when the rotating shaft 341 rotates, the second agitator mylar 344 may transport toner at the supply opening in the toner hopper 330 to the outside of the toner hopper 330. This improves transport efficiency of the toner. For example, a material of the second agitator mylar 344 may also be PET. In this case, an end part of the second agitator mylar 344 may also be in contact with and rub against the inner wall of the toner hopper 330, so that the toner at the supply opening can be fully stirred. In addition, there may be two second agitator mylars 344, and the two second agitator mylars 344 may be centrosymmetrically disposed relative to the rotating shaft 341. For example, the two second agitator mylars 344 may be fastened to the first fastening plate 3411, and are respectively located on two sides of the second fastening plate 3412, or the two second agitator mylars 344 may be fastened to the second fastening plate 3412, and are respectively located on two sides of the first fastening plate 3411.

It should be understood that, in some other embodiments, the blades 342 may also be of an integrated spiral structure. In this case, the blades 342 may be directly disposed around the outer wall of the rotating shaft 341. This design may also implement transport of the toner. Details are not described herein.

It should be noted that, in this embodiment, the toner cartridge 300 may further include a first gear 360, and the first gear 360 may be disposed between an end part of the toner hopper 330 and an inner wall of the cartridge body. For example, in FIG. 6, an example in which the first gear 360 is disposed at the first end 332 of the toner hopper 330 is used for description. In this case, a via may be disposed on the first end 332 of the toner hopper 330, and an end part of the rotating shaft 341 may extend through the via to the outside of the toner hopper 330 and be fastened to the first gear 360. After the toner cartridge 300 is installed on the drum cartridge assembly, a drive motor of the drum cartridge assembly may drive the first gear 360 to rotate, so as to drive the first agitator 340 to rotate synchronously.

Figure 7:
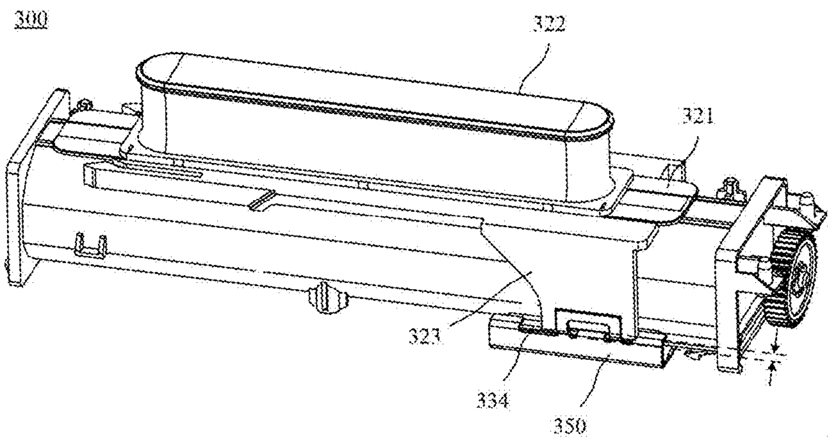
FIG. 7 is a schematic diagram of a partial structure of a toner cartridge according to an embodiment of this application.

FIG. 7 is a schematic diagram of a partial structure of the toner cartridge according to an embodiment of this application. Refer to both FIG. 2 and FIG. 7. In some embodiments, the handle 320 may be disposed on a first side, namely, a side that is of the front housing 311 and that is away from the cover body 312, of the cartridge body 310. During specific implementation, the handle 320 may include a first sliding rail 321 and a handle body 322. The first sliding rail 321 may be fastened to a side that is of the toner hopper 330 and that is away from the cover body 312, the first sliding rail 321 may be disposed in the length direction (an x direction) of the toner hopper 330, and the handle body 322 is slidably assembled on the first sliding rail 321. A hole 313 may be disposed on the first side of the cartridge body 310, the hole 313 may extend in the x direction, and the handle body 322 may pass through the hole 313 and be exposed to the outside of the cartridge body 310, so as to facilitate a user operation. In addition, the handle 320 may further include a connection arm 323. One end of the connection arm 323 is connected to the handle body 322, and the other end may pass through a gap between the toner hopper 330 and an inner wall of the cartridge body 310 and extend to a second side, namely, a side at which the cover body 312 is located, of the cartridge body 310.

A first hopper door 350 may be disposed on the second side of the cartridge body 310. In this case, a second sliding rail 334 may be disposed on the outer wall of the toner hopper 330, the second sliding rail 334 may also be disposed in the x direction, and the first hopper door 350 may be slidably assembled on the second sliding rail 334. It should be noted that a size of the window 3121 provided on the second side of the cartridge body 310 may be greater than a size of the first hopper door 350. In this case, on the second side of the cartridge body 310, the first hopper door 350 may be specifically slidably disposed in the window 3121. A first opening 351 is disposed on the first hopper door 350, and a shape of the first opening 351 may be consistent with the shape of the supply opening 331. In addition, a first foam 335 may be disposed on a side that is of the toner hopper 330 and that faces the first hopper door 350, and the first foam 335 may be squeezed between the first hopper door 350 and the outer wall of the toner hopper 330, to improve effect of sealing the supply opening 331 by the first hopper door 350. It should be understood that a through hole that matches the shape of the supply opening 331 is disposed at a position that is on the first foam 335 and that corresponds to the supply opening 331 of the toner hopper 330, to avoid blocking the supply opening 331 when the first hopper door 350 opens the supply opening 331, and ensure that the toner in the toner hopper 330 can be smoothly transported to the drum cartridge assembly.

The first hopper door 350 is fastened to the connection arm 323. During specific disposition, a groove 3231 may be disposed at an end that is of the connection arm 323 and that is away from the handle body 322, an extension part 352 that is disposed toward the first side of the cartridge body 310 may be disposed on the first hopper door 350, and the extension part 352 may be embedded in the groove 3231, to limit the extension part 352 in the x direction by using an inner wall of the groove 3231. In this way, the first hopper door 350 is clamped and fastened to the connection arm 323. When the user operates the handle body 322 to slide along the first sliding rail 321, the connection arm 323 may drive the first hopper door 350 to move in a same direction along the second sliding rail 334.

It should be noted that, to improve reliability of a connection between the handle body 322 and the first hopper door 350 and motion stability of the first hopper door 350, in this embodiment of this application, there may be specifically two connection arms 323, and the two connection arms 323 are disposed opposite to each other, and may respectively pass through a gap between an upper part of the toner hopper 330 and the cartridge body 310 and a gap between a lower part of the toner hopper 330 and the cartridge body 310 and be connected to the first hopper door 350. It should be noted that, orientation words such as “upper” and “lower” used in the toner cartridge 300 in this embodiment of this application are mainly described based on a display orientation of the toner cartridge 300 in FIG. 3, and do not constitute a limitation on an orientation of the toner cartridge 300 in an actual application scenario.

In addition, refer to FIG. 7. In this embodiment, an end part of the connection arm 323 may be disposed as close as possible to the second sliding rail 334, that is, a clamping position of the connection arm 323 and the first hopper door 350 is disposed as close as possible to the second sliding rail 334. In this way, a distance between a force point of the first hopper door 350 and the second sliding rail 334 can be reduced, and a deflection torque applied by the connection arm 323 to the first hopper door 350 can be reduced, so that the first hopper door 350 can smoothly slide on the second sliding rail 334. This improves motion stability of the first hopper door 350. For example, a distance between the first hopper door 350 and the clamping position of the connection arm 323 and the second sliding rail 334 may not be greater than 2 mm.

Figure 8:
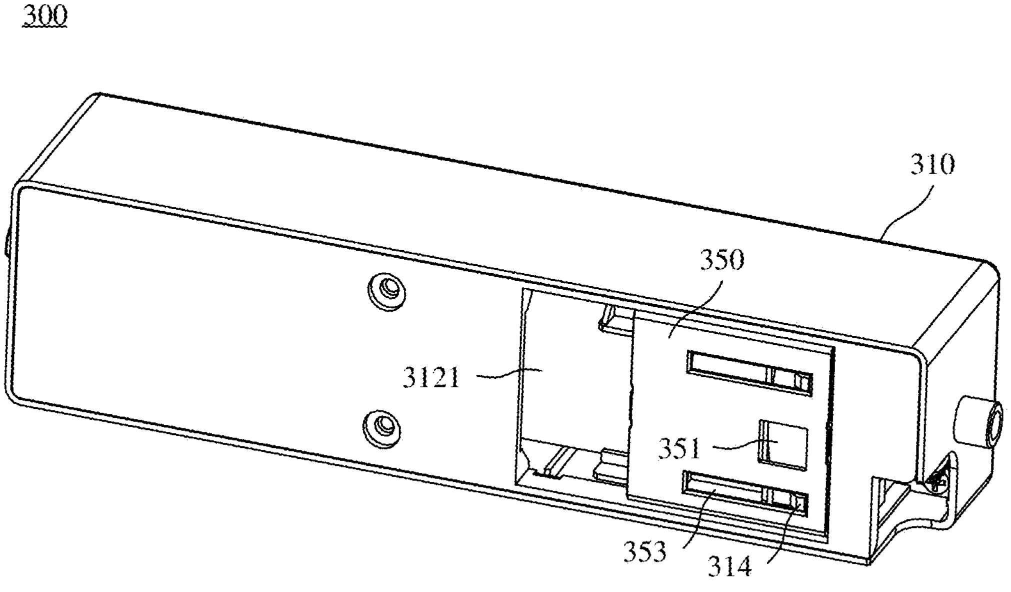
FIG. 8 is a schematic diagram of a structure of a toner cartridge in a working state according to an embodiment of this application.
Figure 9:
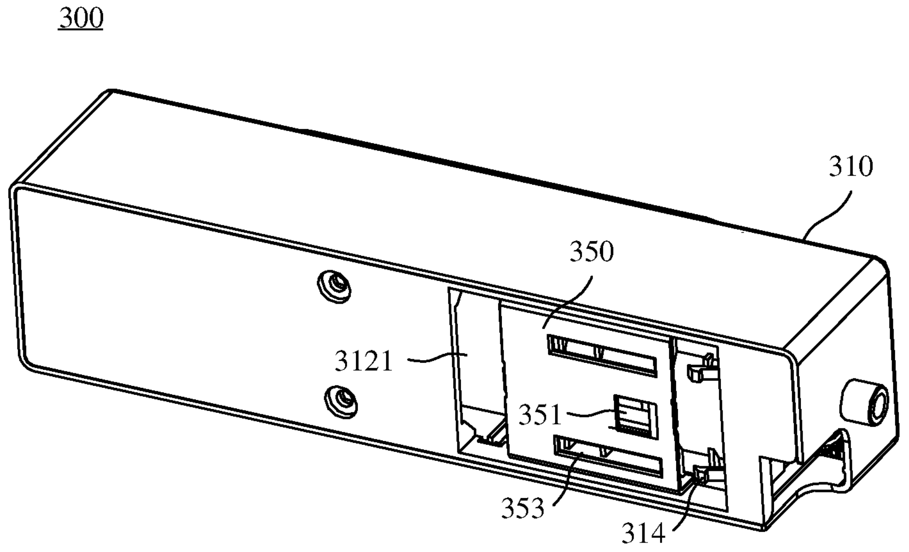
FIG. 9 is a schematic diagram of a structure of a toner cartridge in another working state according to an embodiment of this application.

FIG. 8 is a schematic diagram of a structure of the toner cartridge in a working state according to an embodiment of this application. FIG. 9 is a schematic diagram of a structure of the toner cartridge in another working state according to an embodiment of this application. Refer to FIG. 7, FIG. 8, and FIG. 9 together. A first clamping hook 314 may be disposed on the cartridge body 310, and the first clamping hook 314 may be exposed in the window 3121 of the cartridge body 310, for example, may be exposed on a side that is of the window 3121 and that is close to the first end 332 of the toner hopper 330. A slot 353 may be disposed on the first hopper door 350. When the first hopper door 350 slides to the side that is of the window 3121 and that is close to the first end 332 of the toner hopper 330, the slot 353 may be clamped to the first clamping hook 314 to lock the first hopper door 350 on the side that is of the window 3121 and that is close to the first end 332 of the toner hopper 330. In this case, the first opening 351 of the first hopper door 350 and the supply opening of the toner hopper 330 are disposed in a staggered manner, and the first hopper door 350 may close the supply opening of the toner hopper 330. In this way, toner leakage in the toner hopper 330 is avoided. When the first clamping hook 314 is not clamped to the slot 353 under an action of an external force, the first hopper door 350 may slide in the window 3121 under the driving of the handle 320. When the first hopper door 350 slides to a position at which the first opening 351 and the supply opening are opposite to each other, the toner in the toner hopper 330 may be successively transported to the outside of the toner cartridge 300 through the supply opening, the first opening 351, and the window 3121. It may be understood that, when the first hopper door 350 is locked by the first clamping hook 314, the handle 320 is also locked at a position. In this case, the user cannot unlock the first hopper door 350 by sliding the handle 320. This prevents toner leakage caused by a misoperation.

It should be noted that a limiting structure may be disposed on a side that is of the first sliding rail 321 and that is away from the first end 332 of the toner hopper 330, and the limiting structure may be configured to block the handle body 322 when the first hopper door 350 opens the supply opening, to avoid a case in which the first hopper door 350 blocks the supply opening again because the handle body 322 continues to slide. This ensures that the toner can be smoothly transported to the drum cartridge assembly. Certainly, in some other embodiments, a similar limiting structure may also be disposed on a side that is of the second sliding rail 334 and that is away from the first end 332 of the toner hopper 330, to block the first hopper door 350 when the first hopper door 350 opens the supply opening. Details are not described herein.

In some embodiments, there may be two first clamping hooks 314, and the two first clamping hooks 314 may be arranged from top to bottom, that is, disposed in parallel in a height direction of the toner cartridge 300. Correspondingly, there may also be two slots 353, and the two slots 353 may be clamped to the two first clamping hooks 314 in a one-to-one correspondence. This improves locking reliability of the first hopper door 350.

Figure 10:
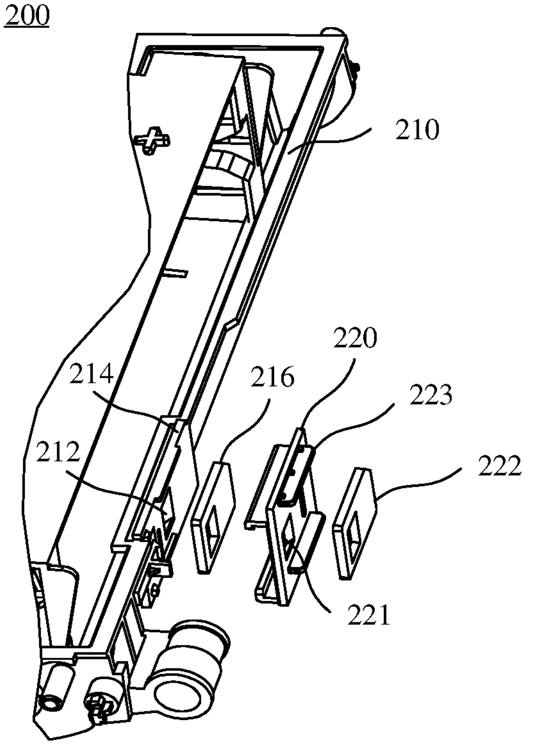
FIG. 10 is a schematic diagram of partial decomposition of a drum cartridge assembly according to an embodiment of this application.
Figure 11:
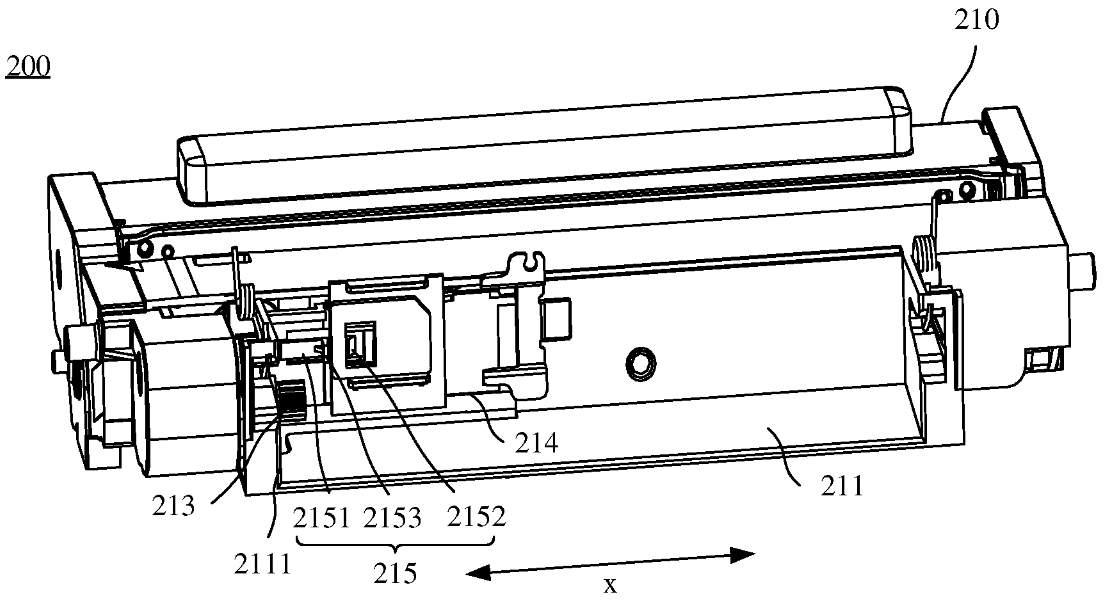
FIG. 11 is a schematic structural diagram of a drum cartridge assembly in a working state according to an embodiment of this application.
Figure 12:
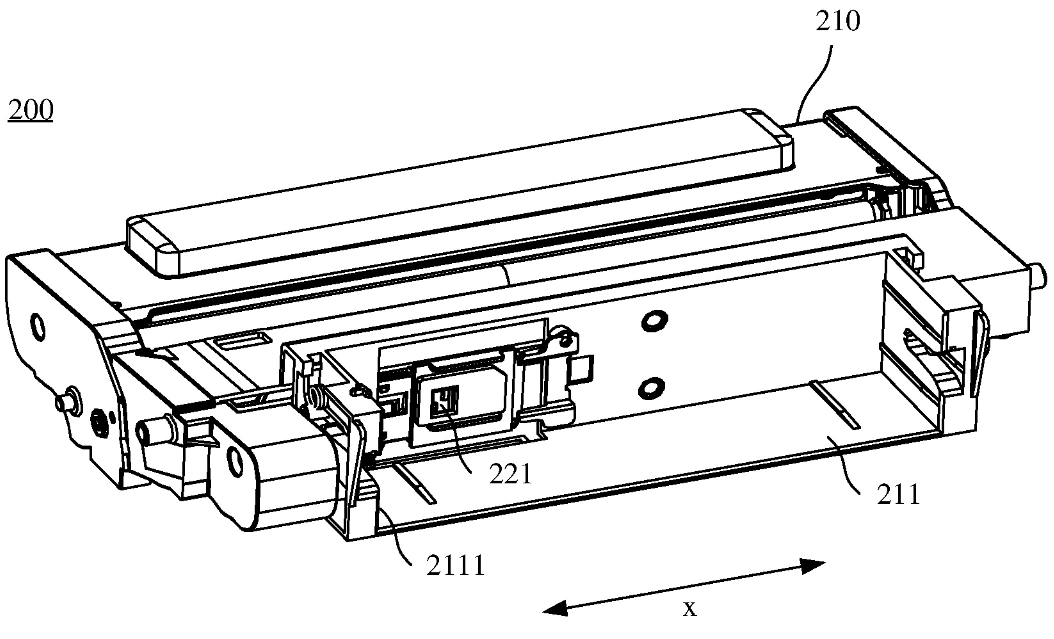
FIG. 12 is a schematic structural diagram of a drum cartridge assembly in another working state according to an embodiment of this application.

FIG. 10 is a schematic diagram of partial decomposition of the drum cartridge assembly according to an embodiment of this application. FIG. 11 is a schematic diagram of a structure of the drum cartridge assembly in a working state according to an embodiment of this application. FIG. 12 is a schematic diagram of a structure of the drum cartridge assembly in another working state according to an embodiment of this application. Refer to FIG. 10 to FIG. 12 together. The drum cartridge assembly 200 includes a hopper body 210 and a second hopper door 220. The accommodating groove 211 for accommodating the toner cartridge is disposed on a side of the hopper body 210. A toner inlet 212 is disposed at the bottom of the accommodating groove 211. The toner inlet 212 may connect the inside of the hopper body 210 to the accommodating groove 211, that is, communicate with the outside of the hopper body 210. After the toner cartridge is installed in the accommodating groove 211, the toner inlet 212 may be opposite to the supply opening of the toner hopper. In addition, a second gear 213 may be disposed at a first end 2111 of the accommodating groove 211, and the second gear 213 may be connected to the drive motor of the drum cartridge assembly 200. After the toner cartridge is installed in position, the second gear 213 may automatically engage with the first gear of the toner cartridge, to transfer a driving force of the drive motor to the first gear, and drive the first agitator of the toner cartridge to rotate.

A third sliding rail 214 is disposed at the bottom of the accommodating groove 211, the third sliding rail 214 may extend in the x direction, and the second hopper door 220 may be slidably assembled on the third sliding rail 214. A second opening 221 is disposed on the second hopper door 220, and a shape of the second opening 221 may be consistent with a shape of the toner inlet 212. When the second hopper door 220 is located on a side that is of the third sliding rail 214 and that is close to the first end 2111 of the accommodating groove 211, the second opening 221 and the toner inlet 212 are staggered. In this case, the second hopper door 220 may seal the toner inlet 212. When the second hopper door 220 slides in a direction away from the first end 2111 of the accommodating groove 211 to a position at which the second opening 221 and the toner inlet 212 are opposite to each other, the toner inlet 212 is opened, and the toner in the toner cartridge may enter the inside of the hopper body 210 through the second opening 221 and the toner inlet 212 in sequence.

In addition, a second clamping hook 215 may be disposed at the bottom of the accommodating groove 211. For example, the second clamping hook 215 may be disposed close to the first end 2111 of the accommodating groove 211. The second clamping hook 215 may include an elastic arm 2151, and a clamping hook body 2152 and a protrusion part 2153 that are disposed on a side that is of the elastic arm 2151 and that is opposite to the inside of the hopper body 210. The clamping hook body 2152 is located at an end that is of the elastic arm 2151 and that is away from the first end 2111 of the accommodating groove 211, and the protrusion part 2153 is located on a side that is of the clamping hook body 2152 and that is close to the first end 2111 of the accommodating groove 211. When the second hopper door 220 is located on a side that is of the third sliding rail 214 and that is close to the first end 2111 of the accommodating groove 211, the clamping hook body 2152 may be clamped to the second opening 221 of the second hopper door 220, and the protrusion part 2153 is located outside the second opening 221. In this case, the second clamping hook 215 may lock the second hopper door 220 on the side that is of the third sliding rail 214 and that is close to the first end 2111 of the accommodating groove 211, to avoid toner leakage inside the hopper body 210. When an external force toward the inside of the hopper body 210 is applied to the protrusion part 2153, the elastic arm 2151 is bent toward the side facing the inside of the hopper body 210, to drive the clamping hook body 2152 to move toward the inside of the hopper body 210, so that the second hopper door 220 can be unlocked, and the second hopper door 220 can slide along the third sliding rail 214.

In some embodiments, a second foam 216 may be disposed at the bottom of the accommodating groove 211, and the second foam 216 may be squeezed between the second hopper door 220 and the bottom of the accommodating groove 211, to improve effect of sealing the toner inlet 212 by the second hopper door 220. In addition, a third foam 222 may be further disposed on a side that is of the second hopper door 220 and that is opposite to the inside of the hopper body 210. After the toner cartridge is installed in the accommodating groove 211, the third foam 222 may be squeezed between the second hopper door 220 and the first hopper door, to reduce a risk of toner leakage between the toner cartridge and the drum cartridge assembly 200. Similarly, a through hole that matches the shape of the toner inlet 212 is disposed at a position that is on the second foam 216 and that corresponds to the toner inlet 212, and a through hole that matches the shape of the second opening 221 is disposed at a position that is on the third foam 222 and that corresponds to the second opening 221 of the second hopper door 220, to avoid blocking the toner inlet 212 when the second hopper door 220 opens the toner inlet 212.

Refer to FIG. 8, FIG. 9, FIG. 11, and FIG. 12 together. A convex rib 223 is disposed on the side that is of the second hopper door 220 and that is opposite to the inside of the hopper body 210, and a size of the convex rib 223 may be approximately equal to a size of the slot 353. After the toner cartridge 300 is installed in the accommodating groove 211, the convex rib 223 may be inserted into the slot 353 of the first hopper door 350, and the first clamping hook 314 is deformed and retracted to the inside of the cartridge body 310 after being squeezed by the convex rib 223, to unlock the first hopper door 350. Similarly, an outer wall of the cartridge body 310 abuts against the protrusion part 2153 of the second clamping hook 215, to apply an external force toward the inside of the hopper body 210 to the protrusion part 2153, so that the second clamping hook 215 unlocks the second hopper door 220. In this case, the first hopper door 350 and the second hopper door 220 are mutually locked in the x direction based on cooperation between the convex rib 223 and the slot 353. After the toner cartridge 300 is installed in position, when the user operates the handle to drive the first hopper door 350 to slide, the second hopper door 220 also slides synchronously. In this way, when the first hopper door 350 slides to open the supply opening, the second hopper door 220 also slides synchronously to open the toner inlet 212, so that a channel between the toner cartridge 300 and the inside of the drum cartridge assembly 200 is connected, so that the toner in the toner cartridge 300 can be smoothly transported to the inside of the drum cartridge assembly 200.

Figure 13:
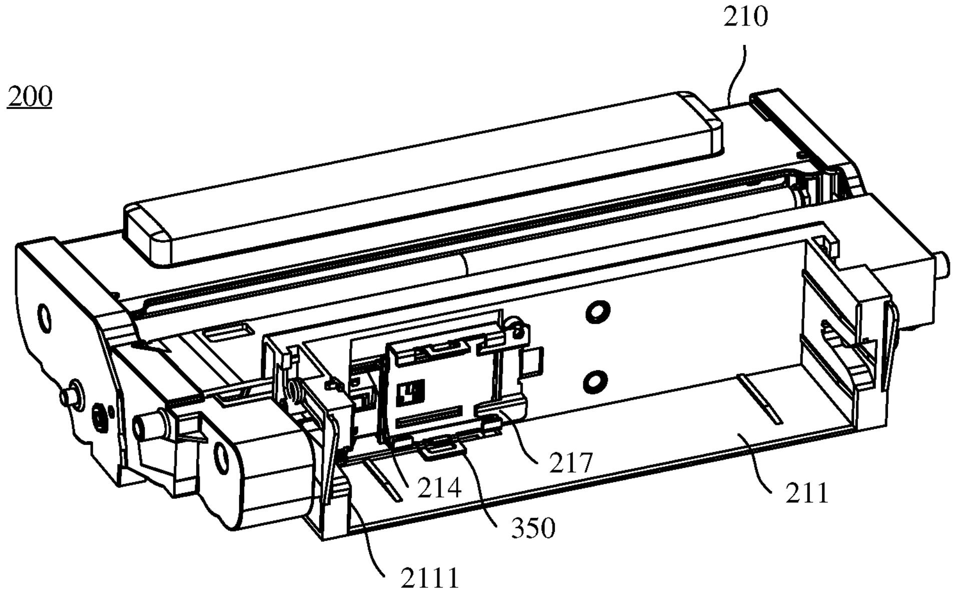
FIG. 13 is a schematic diagram of a status of a first hopper door on a drum cartridge assembly side when a toner inlet is opened.

FIG. 13 is a schematic diagram of a status of the first hopper door on the drum cartridge assembly side when the toner inlet is opened. Refer to FIG. 12 and FIG. 13 together. In embodiments of this application, a limiting arm 217 may be disposed at the bottom of the accommodating groove 211, the limiting arm 217 is located on a side that is of the third sliding rail 214 and that is away from the first end 2111 of the accommodating groove 211, and there may be a specific gap between the limiting arm 217 and the bottom of the accommodating groove 211. After the toner cartridge 300 is installed in the accommodating groove 211, the user operates the handle to drive the first hopper door 350 and the second hopper door 220 to slide synchronously. When the supply opening and the toner inlet 212 are separately opened, the first hopper door 350 may slide to the gap between the limiting arm 217 and the bottom of the accommodating groove 211. In this case, a side that is of the first hopper door 350 and that faces the toner hopper 330 may abut against the limiting arm 217, so that the toner cartridge 300 is limited in an insertion direction of the toner cartridge 300 and the accommodating groove 211, to prevent the toner cartridge 300 from being loose or falling off in a working process of the laser printer, and ensure working reliability of the laser printer.

Figure 14:
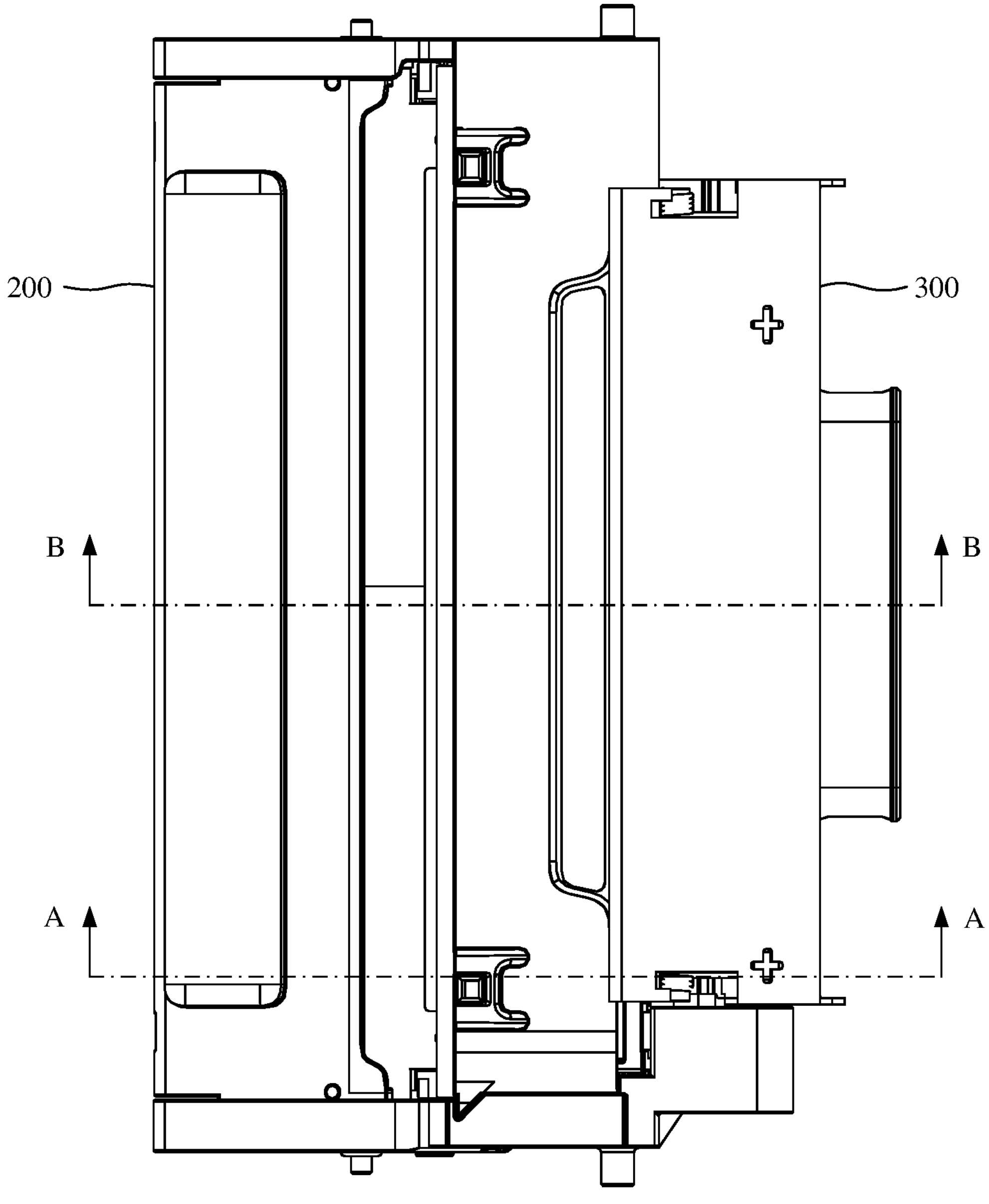
FIG. 14 is a schematic diagram of a structure obtained after a drum cartridge assembly and a toner cartridge are assembled.
Figure 15:
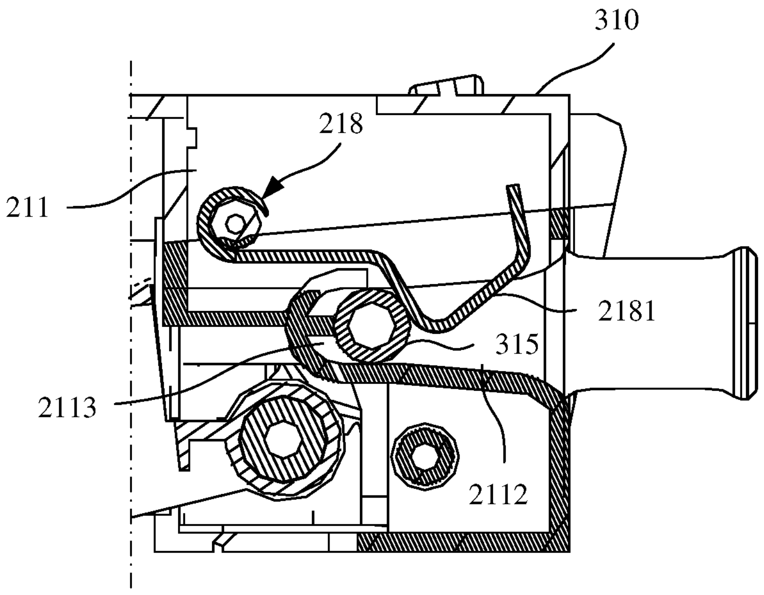
FIG. 15 is a schematic diagram of a structure of a local cross section of the assembly structure shown in FIG. 14 at A-A.

FIG. 14 is a schematic diagram of a structure obtained after the drum cartridge assembly and the toner cartridge are assembled. FIG. 15 is a schematic diagram of a structure of a local cross section of the assembled structure shown in FIG. 14 at A-A. Refer to FIG. 13 to FIG. 15 together. In embodiments, in a length direction of the toner cartridge 300, a limiting shaft 315 may be disposed at an end part of the cartridge body 310, and a guide sliding slot 2112 is disposed on a side wall of the accommodating groove 211. When the toner cartridge 300 is installed in the accommodating groove 211, the limiting shaft 315 may be correspondingly assembled in the guide sliding slot 2112. In this way, an insertion process of the toner cartridge 300 is limited through cooperation between the limiting shaft 315 and the guide sliding slot 2112. In addition, a torsion spring 218 may be further disposed in the accommodating groove 211. One end of the torsion spring 218 is fastened to the hopper body 210, and the other end of the torsion spring 218 has a bending part 2181. The bending part 2181 may be located above the guide sliding slot 2112, and the bending part 2181 may be specifically bent toward a side that is away from the guide sliding slot 2112. In this case, a limiting space 2113 may be formed between the bending part 2181 and the bottom of the guide sliding slot 2112. When the limiting shaft 315 slides along the guide sliding slot 2112 toward a direction close to the bottom of the accommodating groove 211, and passes through the bending part 2181, the bending part 2181 generates elastic deformation under an abutment action of the limiting shaft 315, so that the limiting shaft 315 can enter the rear-side limiting space 2113 from the bottom of the bending part 2181, and then the bending part 2181 is restored to an initial position under an elastic action, and the limiting shaft 315 is limited to the limiting space 2113. By using this design, the user can easily identify whether the toner cartridge 300 is properly installed, and the bending part 2181 may also apply a specific abutment force to the limiting shaft 315, so that the toner cartridge 300 can be more stably fastened in the accommodating groove 211.

Figure 16:
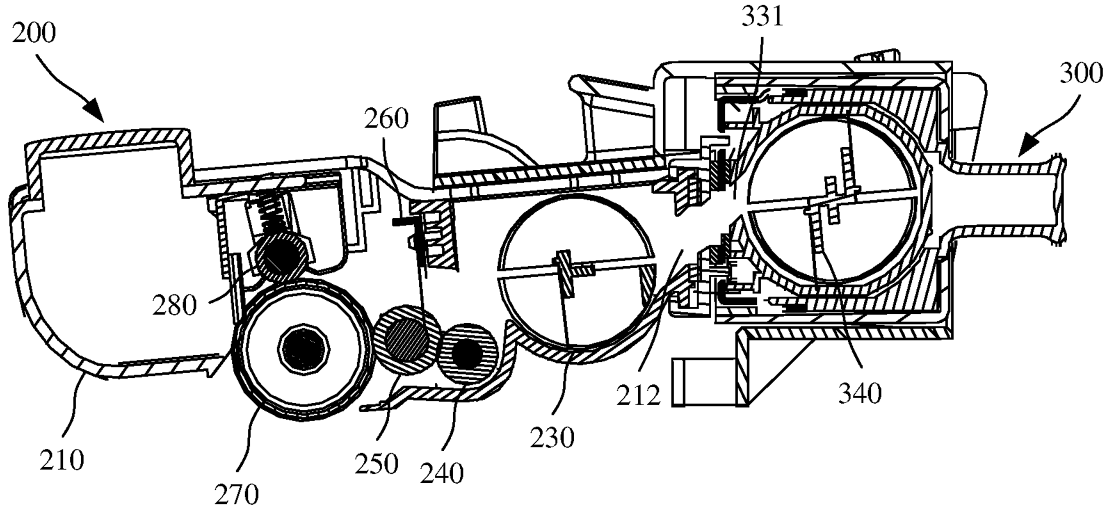
FIG. 16 is a schematic diagram of a structure of a partial cross section of the assembly structure shown in FIG. 14 at B-B.

FIG. 16 is a schematic diagram of a structure of a partial cross section of the assembly structure shown in FIG. 14 at B-B. Refer to FIG. 16. The drum cartridge assembly 200 may further include a second agitator 230, a supply roller 240, a developer roller 250, a doctor blade 260, a photosensitive drum 270, and a charge roller 280 that are disposed in the hopper body 210. The second agitator 230, the supply roller 240, the developer roller 250, and the photosensitive drum 270 are arranged in sequence in a direction away from the toner inlet 212. In addition, a peripheral surface of the supply roller 240 is in contact with a peripheral surface of the developer roller 250, and the peripheral surface of the developer roller 250 is in contact with a peripheral surface of the photosensitive drum 270. The doctor blade 260 is disposed on a side of the developer roller 250, for example, may be disposed above the developer roller 250. The doctor blade 260 is disposed in contact with the peripheral surface of the developer roller 250. In this way, when the developer roller 250 rotates, the doctor blade 260 may generate friction with the peripheral surface of the developer roller 250. The charge roller 280 is disposed on a side of the photosensitive drum 270, for example, may be disposed above the photosensitive drum 270, and a peripheral surface of the charge roller 280 is in contact with the peripheral surface of the photosensitive drum 270.

After the supply opening 331 and the toner inlet 212 are separately opened, the toner in the toner cartridge 300 is transported to the hopper body 210 under an action of the first agitator 340, and continues to be transported to the left side of the hopper body 210 under an action of the second agitator 230 disposed at the toner inlet 212. Then, the peripheral surface of the supply roller 240 on the left side of the second agitator 230 may be wrapped with the toner when the supply roller 240 rotates. A structure of the second agitator 230 may be similar to the structure of the first agitator 340. Details are not described herein again.

A surface material of the developer roller 250 is electrified rubber. The toner on the supply roller 240 may be squeezed and coated on the surface of the developer roller 250 when the supply roller 240 rotates opposite to the developer roller 250. In this case, the toner does not show polarity. When the developer roller 250 rotates with the toner and is tangent to the doctor blade 260, the tip of the doctor blade 260 is discharged, so that the toner is negatively charged. The toner forms thin and evenly distributed toner fog on the surface of the developer roller 250 under actions of the doctor blade 260 and a magnetic field.

The photosensitive drum 270 is a photosensitive device, and has a characteristic of being conducted by light. A photoconductive coating on the surface of the photosensitive drum 270 may be charged with uniform charges by the charge roller 280 before scanning exposure. When a laser inside the laser printer scans a laser beam to the photosensitive drum 270 in a form of a dot matrix, a scanned point is conducted because of exposure, and an electric charge is quickly released to the ground by a conductive substrate. A point that is not scanned still maintains an original electric charge. In this way, a potential difference latent image, namely, an electrostatic latent image, is formed on the surface of the photosensitive drum 270. When the photosensitive drum with the electrostatic latent image rotates to be in contact with the developer roller 250 with the toner, the toner that is on the surface of the developer roller 250 and that has an opposite charge may be adsorbed to the surface of the photosensitive drum 270, to form a toner image.

When the photosensitive drum 270 with the toner image continues to rotate and reaches a graphic transfer printing apparatus, printing paper is also sent between the photosensitive drum 270 and the graphic transfer printing apparatus simultaneously. In this case, the image transfer printing apparatus releases a strong voltage on the back of the printing paper, to adsorb the toner image on the photosensitive drum 270 to the printing paper, and then sends the printing paper with the toner image to a fuser unit for heating and pressure hot fusion. The toner is immersed into the printing paper after fusion. Finally, a printed text or image is output.

It should be noted that the drum cartridge assembly 200 may further include a gear group and the drive motor. During specific disposition, the gear group may include a plurality of gears disposed in a one-to-one correspondence with the photosensitive drum 270, the developer roller 250, the supply roller 240, and the second agitator 230. The gears are engaged with each other in sequence, and the drive motor may be in transmission connection to the gear drive at the photosensitive drum 270. In this way, a driving force output by the drive motor may be successively transferred to the photosensitive drum 270, the developer roller 250, the supply roller 240, and the second agitator 230, to drive the entire drum cartridge assembly 200 to run. In addition, a gear shaft may be further disposed on the right side of the second agitator 230. One end of the gear shaft is located inside the hopper body 210 and engaged with a gear at the second agitator 230 by using a third gear. The other end of the gear shaft may extend into the accommodating groove through an end part of the accommodating groove, and the second gear is disposed at the end of the gear shaft. In this way, the driving force transferred by the drive motor to the second agitator 230 may continue to be transferred to the right side by the gear shaft, and finally to the first gear of the toner cartridge 300.

It can be learned from the foregoing descriptions that, in embodiments of this application, the toner cartridge 300 and the drum cartridge assembly 200 are independently disposed and can be interlocked, so that the toner cartridge 300 in the laser printer can be separately replaced. A replacement step is simple. In addition, because the toner cartridge 300 does not include components such as the photosensitive drum 270 and the developer roller 250, replacement costs are low. In addition, the toner cartridge 300 and the drum cartridge assembly 200 are arranged in a transverse (for example, a length or a width) direction of the laser printer. Compared with a manner in which the toner cartridge 300 and the drum cartridge assembly 200 are vertically stacked in the conventional technology, this helps reduce a height size of the laser printer. When the toner cartridge 300 is replaced, only the toner cartridge 300 needs to be taken out and installed in the installation hole on the side surface of the laser printer, and an upper cover of the laser printer does not need to be opened. During an operation, the user does not see an internal part of the printer other than the drum cartridge assembly 200. This helps improve user experience.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A toner cartridge, comprising:

a cartridge body comprising a first side and a second side that are at opposite positions, wherein a hole extends in the first side of the cartridge body, and a window is disposed on the second side of the cartridge body;

a toner hopper disposed in the cartridge body, wherein the toner hopper is configured to accommodate toner, and a supply opening exposed in the window is disposed at a position that is on the toner hopper and that faces the window;

a first agitator disposed in the toner hopper, wherein the first agitator is configured to transport the toner in the toner hopper to the supply opening;

a first hopper door slidably disposed on a side that is of the toner hopper and that faces the window, wherein a slot is disposed on the first hopper door, and the first hopper door is configured to open or close the supply opening when sliding;

a first clamping hook disposed on the second side of the cartridge body, wherein the first clamping hook is configured to be clamped to the slot when the first hopper door closes the supply opening; and a handle slidably disposed on a side that is of the toner hopper and that is away from the window, wherein the handle passes through the hole and is exposed to an outer side of the cartridge body, and the handle is fastened to the first hopper door.

2. The toner cartridge according to claim 1, wherein the first clamping hook is disposed on a side that is of the first hopper door and that faces the toner hopper.

3. The toner cartridge according to claim 1, wherein the first agitator comprises a rotating shaft and a plurality of blades fastened to the rotating shaft, and the plurality of blades are disposed spirally in an axial direction of the rotating shaft.

4. The toner cartridge according to claim 3, wherein an included angle between at least two adjacent blades of the plurality of blades ranges from 75° to 90°.

5. The toner cartridge according to claim 4, wherein a first agitator mylar is disposed on each blade of the plurality of blades, each first agitator mylar comprises a flexible material, and an end part of each first agitator mylar exceeds a side that is of the corresponding blade and that faces away from the rotating shaft, and is in contact with an inner wall of the toner hopper.

6. The toner cartridge according to claim 5, wherein a second agitator mylar is disposed at a position that is on the rotating shaft and that corresponds to the supply opening, and an end part of the second agitator mylar is configured to be in contact with the inner wall of the toner hopper.

7. The toner cartridge according to claim 6, wherein there are two second agitator mylars, and the two second agitator mylars are centrosymmetrically disposed relative to the rotating shaft.

8. The toner cartridge according to claim 1, wherein the handle comprises a first sliding rail, a handle body, and a connection arm, the first sliding rail is disposed on the first side that is of the toner hopper and that is away from the window, the handle body is slidably assembled on the first sliding rail, and the connection arm passes through a gap between the toner hopper and an inner wall of the cartridge body and is fastened to the first hopper door.

9. The toner cartridge according to claim 8, wherein a second sliding rail is disposed on the second side that is of the toner hopper and that faces the window, and the first hopper door is slidably assembled on the second sliding rail; and a distance between a connection position of the connection arm and the first hopper door and the second sliding rail is not greater than 2 mm in a direction from the first side to the second side of the cartridge body.

10. The toner cartridge according to claim 1, wherein a first opening is in the first hopper door, and wherein:

when the first hopper door slides to a position at which the first opening and the supply opening are opposite to each other, the first hopper door opens the supply opening; and when the first hopper door slides to a position at which the first opening and the supply opening are staggered, the first hopper door closes the supply opening.

11. A laser printer, comprising:

a housing;

a drum cartridge assembly; and a toner cartridge, comprising:

a cartridge body comprising a first side and a second side that are at opposite positions, wherein a hole extends in the first side of the cartridge body, and a window is disposed on the second side of the cartridge body;

a toner hopper disposed in the cartridge body, wherein the toner hopper is configured to accommodate toner, and a supply opening exposed in the window is disposed at a position that is on the toner hopper and that faces the window;

a first agitator disposed in the toner hopper, wherein the first agitator is configured to transport the toner in the toner hopper to the supply opening;

a first hopper door slidably disposed on a side that is of the toner hopper and that faces the window, wherein a slot is disposed on the first hopper door, and the first hopper door is configured to open or close the supply opening when sliding;

a first clamping hook disposed on the second side of the cartridge body, wherein the first clamping hook is configured to be clamped to the slot when the first hopper door closes the supply opening; and a handle slidably disposed on a side that is of the toner hopper and that is away from the window, wherein the handle passes through the hole and is exposed to an outer side of the cartridge body, and the handle is fastened to the first hopper door;

wherein an installation hole extends in a side surface of the housing;

wherein the drum cartridge assembly is disposed in the housing, the drum cartridge assembly comprises a hopper body, an accommodating groove is disposed at a position that is on a side of the hopper body and that corresponds to the installation hole, a toner inlet is disposed at a bottom of the accommodating groove, and the toner inlet is connected to an inside of the hopper body; and wherein the toner cartridge is assembled into the accommodating groove through the installation hole, and the supply opening of the toner cartridge and the toner inlet are opposite to each other.

12. The laser printer according to claim 11, wherein the drum cartridge assembly further comprises a second hopper door, the second hopper door is slidably disposed at the bottom of the accommodating groove, and the second hopper door is configured to open or close the toner inlet when sliding; and wherein a convex rib is disposed on a side that is of the second hopper door and that faces the toner cartridge, and the convex rib is configured to: when the toner cartridge is installed in the accommodating groove, be inserted into the slot of the first hopper door, and squeeze the first clamping hook to the outside of the slot.

13. The laser printer according to claim 12, wherein a first opening extends in the second hopper door, and wherein:

when the second hopper door slides to a position at which the first opening and the toner inlet are opposite to each other, the second hopper door opens the toner inlet; and when the second hopper door slides to a position at which the first opening and the toner inlet are staggered, the second hopper door closes the toner inlet.

14. The laser printer according to claim 13, wherein a second clamping hook is disposed at the bottom of the accommodating groove, the second clamping hook comprises an elastic arm, and a clamping hook body and a protrusion part that are disposed on a side that is of the elastic arm and that faces the toner cartridge, and the clamping hook body is configured to be clamped to the first opening when the second hopper door closes the toner inlet; and wherein an outer wall of the second side of the cartridge body is configured to squeeze the protrusion part when the toner cartridge is installed in the accommodating groove, so that the elastic arm is bent toward a side away from the toner cartridge, and the clamping hook body is not clamped to the first opening.

15. The laser printer according to claim 11, wherein a limiting arm is disposed at the bottom of the accommodating groove, and a gap is between the limiting arm and the bottom of the accommodating groove; and wherein when the first hopper door slides in a direction of opening the supply opening, the first hopper door may be inserted into the gap between the limiting arm and the bottom of the accommodating groove.

16. The laser printer according to claim 11, wherein a guide sliding slot and a torsion spring are disposed on a side wall of the accommodating groove, the guide sliding slot extends in a depth direction of the accommodating groove, a first end of the torsion spring is fastened to the hopper body, a second end of the torsion spring has a bending part, and a limiting space is between the bending part and a bottom of the guide sliding slot; and wherein a limiting shaft cooperating with the guide sliding slot is disposed at an end part of the cartridge body, and when the toner cartridge is installed in the accommodating groove, the limiting shaft is limited in the limiting space by the bending part.

17. The laser printer according to claim 11, wherein a first gear is disposed at an end of a rotating shaft; and wherein the drum cartridge assembly further comprises a drive motor and a gear group, and the drive motor is in transmission connection to the gear group.

* * * * *